US007961694B1

(12) United States Patent
Chan et al.

(10) Patent No.: US 7,961,694 B1
(45) Date of Patent: Jun. 14, 2011

(54) PEER-TO-PEER COLLABORATIVE STREAMING AMONG MOBILE TERMINALS

(75) Inventors: Shueng Han Gary Chan, Hong Kong (CN); Man Fung Leung, Hong Kong (CN); Oscar Chi Lim Au, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 853 days.

(21) Appl. No.: 11/754,985

(22) Filed: May 29, 2007

Related U.S. Application Data

(60) Provisional application No. 60/808,434, filed on May 26, 2006.

(51) Int. Cl.
*H04W 4/00* (2009.01)
(52) U.S. Cl. .................. 370/341; 370/329; 455/445
(58) Field of Classification Search .............. 455/41.2, 455/519, 11.1, 13.1, 445, 151.2; 370/278, 370/442, 341, 310, 340, 329, 310.2, 328, 370/338, 323, 327, 492, 501
See application file for complete search history.

(56) References Cited

U.S. PATENT DOCUMENTS

| | | | |
|---|---|---|---|
| 6,757,735 B2 | 6/2004 | Apostolopulos et al. | |
| 6,845,091 B2 | 1/2005 | Ogier et al. | |
| 6,941,378 B2 | 9/2005 | Apostolopoulos et al. | |
| 7,035,937 B2 | 4/2006 | Haas et al. | |
| 7,554,982 B2 * | 6/2009 | Nakamura et al. | 370/392 |
| 2003/0026221 A1 * | 2/2003 | Kotzin | 370/329 |
| 2003/0040316 A1 * | 2/2003 | Stanforth et al. | 455/445 |
| 2004/0062211 A1 * | 4/2004 | Uhlik | 370/278 |
| 2004/0203383 A1 * | 10/2004 | Kelton et al. | 455/41.2 |
| 2005/0239495 A1 * | 10/2005 | Bayne | 455/550.1 |

OTHER PUBLICATIONS

IEEE, "Wireless LAN Medium Access Control (MAC) and Physical Layer (PHY) specifications," in IEEE Standard 802.11, Sep. 1999.
P. Bhagwat, "Bluetooth: technology for short-range wireless apps," IEEE Internet Computing, vol. 5, pp. 96-103, 2001.
J. G. Apostolopoulos, "Error-resilient video compression through the use of multiple states," in Proceedings of IEEE ICIP, Sep. 2000, vol. 3, pp. 352-355.
A. R. Reibman, H. Jafarkhani, Yao Wang, M. T. Orchard, and R. Puri, Multiple description coding for video using motion compensated prediction,in Proceedings of IEEE ICIP, Oct. 1999, pp. 837-841.
V. A. Vaishampayan and S. John, "Balanced interframe multiple description video compression," in Proceedings of ICIP, Oct. 1999, vol. 3, pp. 812-816.
E. Yanmaz, O. Tonguz, S. Mishra, Hongyi Wu, and Chunming Qiao, "Efficient dynamic load balancing algorithms using iCAR systems: a generalizedframework," in Proceedings of Vehicular Technology Conference. IEEE, Fall 2002, pp. 586-590.

(Continued)

*Primary Examiner* — Kent Chang
*Assistant Examiner* — San Htun
(74) *Attorney, Agent, or Firm* — Schwabe, WIlliamson & Wyatt, P.C.

(57) ABSTRACT

Systems and methods for collaborative streaming among mobile terminals. Periodically, the mobile terminals may pull a portion of the data stream from a content provider coupled thereto over a primary channel and distribute the pulled data to neighboring mobile terminals, possibly including other mobile terminals pulling portions of the data stream from the content provider and passive mobile terminals that are only receiving pulled data. By transferring data over the secondary channel, the cost to any one terminal to receive the data stream is reduced.

15 Claims, 8 Drawing Sheets

OTHER PUBLICATIONS

H. Wu, C. Qiao, S. De, and O. Tonguz, "Integrated cellular and ad hoc relaying systems: iCAR," IEEE Journal on Selected Areas in Communications,vol. 19, No. 10, pp. 2105-21152000.

A. Nandan, S. Das, G. Pau, M. Gerla, and M.Y. Sanadidi, "Co-operative downloading in vehicular ad-hoc wireless networks," in Proceedings of Wireless On-demand Network Systems and Services, 2005, pp. 32-41.

S. Das, A. Nandan, G. Pau, M.Y. Sanadidi, and M. Gerla, "SPAWN: a swarming protocol for vehicular ad-hoc wireless networks," in Proceedings ofthe 1st ACM international workshop on Vehicular ad hoc networks, 2004, pp. 93-94.

J.-C. Chen, S. Li, S.-H. Chan, and J.-Y. He, "WIANI: Wireless infrastructure and ad-hoc network integration," in Proceedings of IEEE International Conference on Communications (ICC), Korea, May 2005, IEEE, pp. 3623-3627.

S. Kang and M. Mutka, "A mobile peer-to-peer approach for multimedia content sharing using 3G/WLAN dual mode channels," Wireless Communicationsand Mobile Computing, vol. 5, pp. 633-645, Sep. 2005.

S. Kang and M. Mutka, "Mobile peer membership management to support multimedia streaming," in Proceedings of ICDCS Workshop on Mobile and Wireless Networks, May 2003, pp. 770-775.

S. Kang and M. Mutka, •A mobile peer-to-peer approach for multimedia content sharing using 3G/WLAN dual mode channels,• Wireless Communicationsand Mobile Computing, vol. 5, pp. 633•645, Sep. 2005.

J.-C. Chen, S. Li, S.-H. Chan, and J.-Y. He, •WIANI: Wireless infrastructure and ad-hoc network integration,• in Proceedings of IEEE International Conference on Communications Korea: IEEE, May 2005, pp. 3623•3627.

X. Wu, B. Mukherjee, and S.-H. G. Chan, •MACA: An ef cient channel allocation scheme in cellular networks,• in Proceedings of IEEE Globecom'00, San Francisco, CA, Nov. 27-Dec. 1, 2000, pp. 1385•1389.

X. Wu, S.-H. G. Chan, and B. Mukherjee, •MADF: A novel approach to add an ad-hoc overlay on A xed cellular infrastructure,• in Proceedings of the IEEE Wireless Communications and Networking Conference (WCNC), Chicago, IL, Sep. 23-28, 2000, pp. 549•554.

V. N. Padmanabhan, H. J. Wang, and P. A. Chou, •Resilient peer-to-peer streaming,• in Proceedings of Network Protocols, Nov. 2003, pp. 16•27.

J. Apostolopoulos, T. Wong, W. Tan, and S. Wee, •On multiple description streaming with content delivery networks,• in Proceedings of IEEE INFOCOM,Jun. 2002, pp. 1736•1745.

S. Wee, J. Apostolopoulos, W. tian Tan, and S. Roy, •Research and design of a mobile streaming media content delivery network,• in Proceedings of IEEE International Conference on Multimedia and Expo, vol. 1, Jul. 2003, pp. 5•8.

H. Lim and C. Kim, •Multicast tree construction and ooding in wireless ad hoc networks,• in Proceedings of ACM International Workshop on Modeling Analysis and Simulation of Wireless and Mobile Systems, 2000, pp. 61•68.

G. Calinescu, I. I. Mandoiu, P.-J. Wan, and A. Z. Zelikovsky, •Selecting forwarding neighbors in wireless ad hoc networks,• ACM Mobile Networks and Applications, vol. 9, No. 2, pp. 101•111, Apr. 2004.

A. Qayyum, L. Viennot, and A. Laouiti, •Multipoint relaying for ooding broadcast messages in mobile wireless networks,• in Proceedings of Hawaii International Conference on System Sciences (HICSS), Jan. 2002, pp. 3866•3875.

W. Peng and X.-C. Lu, •On the reduction of broadcast redundancy in mobile ad hoc networks,• in Proceedings of Mobile and Ad Hoc Networking and Computing, Aug. 2000, pp. 129•130.

W. Peng and X.-C. Lu, •AHBP: An ef cient broadcast protocol for mobile ad-hoc networks,• Journal of Science and Technology (JCST), vol. 16, pp. 114•125, 2001.

M. Chatterjee, S. K. Das, and D. Turgut, •WCA: A weighted clustering algorithm for mobile ad hoc networks,• Journal of Cluster Computing, vol. 5, No. 2, pp. 193•204, Apr. 2002.

F. Kuhn and R. Wattenhofer, •Constant-time distributed dominating set approximation,• in Proceedings of ACM Int. Symposium on the Principles of Distributed Computting (PODC), 2003, pp. 25•32.

M.-F. Leung, S.-H. G. Chan, and O. C. Au, •COSMOS: Peer-to-peer collaborative streaming among mobiles,• in Proceedings of IEEE International Conference on Multimedia Expo (ICME) (invited), Toronto, Canada, Jul. 2006, pp. 865•868.

M.-F. Leung and S.-H. G. Chan, •Broadcast-based peer-to-peer video streaming among mobiles,• IEEE Transactions on Broadcasting (Special issue on Mobile Multimedia Broadcasting), 2006 (Submitted).

M.-F. Leung,•Broadcast-based peer-to-peer video streaming among mobiles,• Master's thesis, The Hong Kong University of Science and Technology,Hong Kong, 2006.

\* cited by examiner

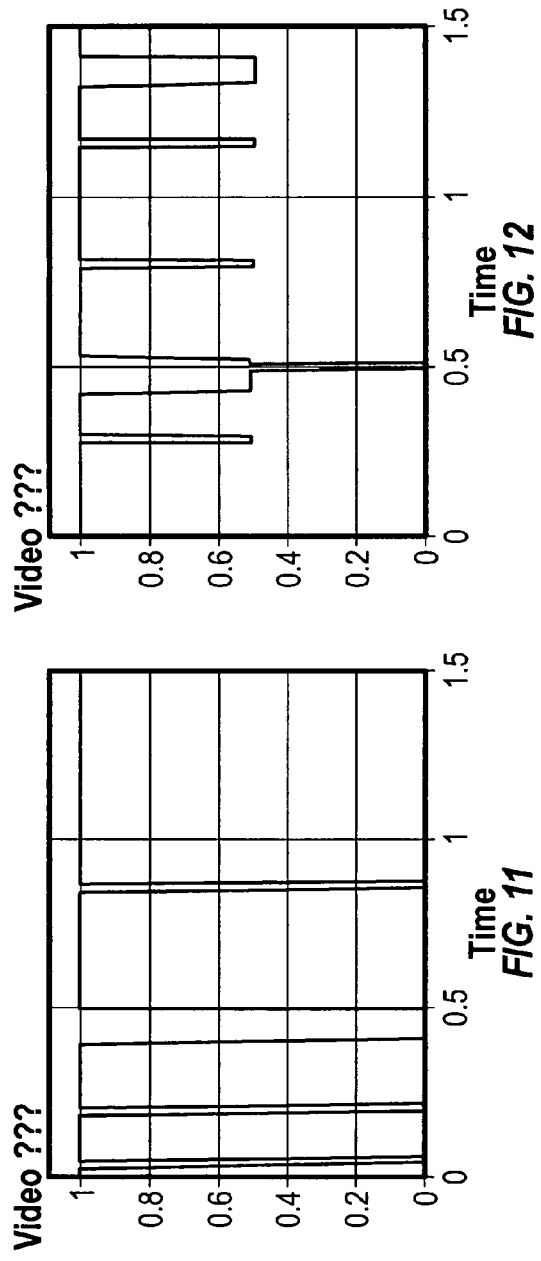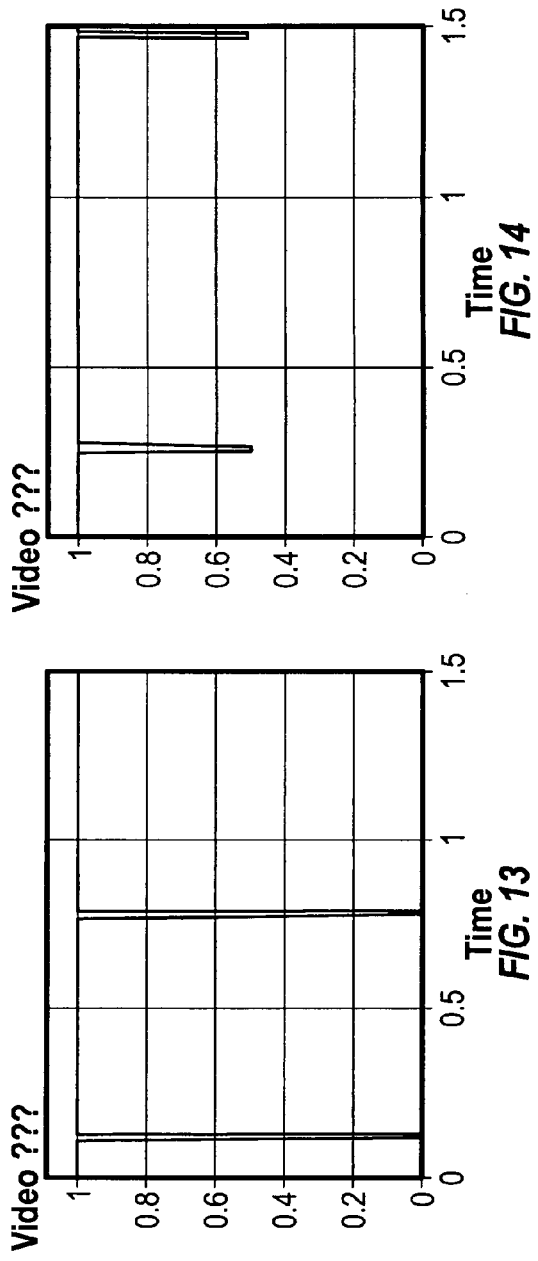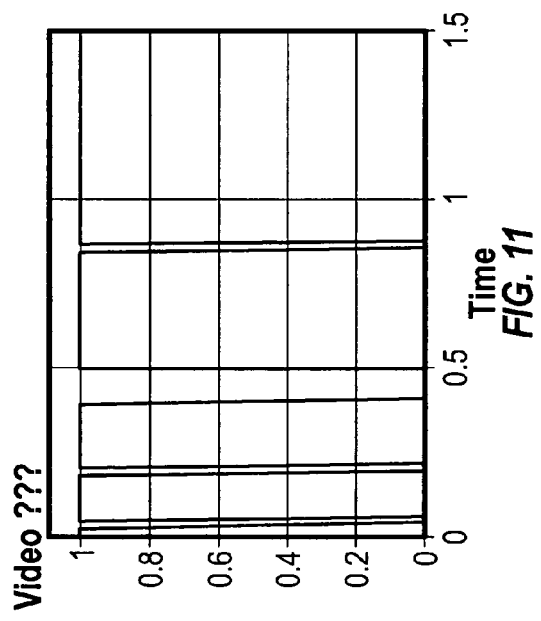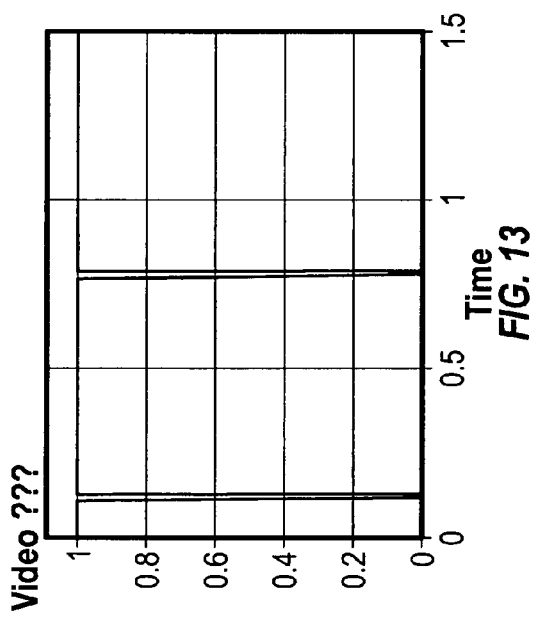

PEER-TO-PEER COLLABORATIVE STREAMING AMONG MOBILE TERMINALS

CROSS REFERENCE TO RELATED APPLICATION

The present application claims priority from U.S. Provisional Patent Application Ser. No. 60/808,434 filed. May 26, 2006, which is hereby incorporated by reference as if reproduced in its entirety.

BACKGROUND AND SUMMARY OF THE INVENTIONS

The present application relates to data streaming techniques, and more particularly to peer-to-peer (P2P) collaborative streaming of content between mobile terminals of an ad-hoc network.

BACKGROUND

Mobile Streaming Systems

In recent years, the use of wireless networks to distribute content within a service area thereof has become increasingly common. For example, a mobile terminal within range of a base station of a third generation (3G) cellular network is capable of "pulling content" from a remote server, for example, a media server, residing at or coupled to the base station. While some content is freely disseminated, more typically, the user of the mobile terminal is charged a fee for the content streamed thereto. As many such fees are based upon the amount of data streamed to the mobile terminal, the streaming of large amounts of content can prove quite costly to the user.

Limitations on the capacity of the 3G cellular network to distribute content also serve to maintain the high cost of multimedia streaming services. For example, a 3G cellular network typically has a limited number of channels which may be used by the mobile terminals to pull content. As the resources available to dedicate to multimedia streaming services are relatively fixed and cannot be readily expanded to meet a rising demand for such services, multimedia streaming services are not scalable and, as a result, remain costly regardless of the demand therefor. Other limitations have also served to discourage widespread usage of multimedia streaming services. For example, in order to receive a data stream, a mobile terminal must be within range of the base station or other transmitter of the content stream. As a result, loss of a portion of the data stream may result if the mobile terminal temporarily leaves the coverage area or otherwise loses the signal from the base station.

Integrated cellular and ad-hoc relaying ("iCAR") systems have contemplated the use of a secondary channel for transporting data. However, iCAR systems focus on relaying data from the mobile terminal to the base station and provide little guidance with respect to streaming data from the base station to the mobile terminal. Moreover, as the relay points utilized by iCAR systems are stationary and reliable, there is no need for iCAR systems to address a number of fault issues that arise when a mobile terminal moves out of range or otherwise loses the signal of the base station. The Swarming Protocol for vehicular Ad-hoc Wireless Networks ("SPAWN") has contemplated the use of an ad-hoc network for the delivery of content in vehicular networks. However, since SPAWN utilizes a gossip mechanism to exchange information between users, undesirable exchange overhead is introduced into point-to-point communications.

Finally, a Cooperating ad-hoc environment to support messaging ("CHUM") network shares multimedia data among mobile devices in an ad-hoc manner. However, as a CHUM network seeks to minimize the streaming cost of the entire ad-hoc network, it chooses one peer, generally referred to as a proxy, to pull multimedia data from the content provider. In turn, the proxy uses a tree topology structure to forward the multimedia data to all of the other peers of the ad-hoc network. As a result, in order to determine the tree path to be used to distribute content, each peer must collect information from its neighbors. Furthermore, to ensure that each peer incurs a fair share of the cost of streaming data from the content provider, a CHUM network employs a mechanism which enables peers to take turns acting as proxy. For this reason, CHUM networks require that a proxy scheduling queue for storing the order of the next proxy be maintained.

P2P Collaborative Streaming

The present application provides new methods for collaborative streaming of content between peers—mobile terminals that are nodes of an ad-hoc meshed network. In various embodiments, certain mobile terminals (or "pullers") within range of a base station randomly select a portion of the content to pull over the cellular channel. The pullers then share the content with neighboring mobile terminals with which the pullers have established links over free secondary channels. In order to fairly share the cost of streaming content, the mobile terminals take turns pulling content over the cellular channel.

In one class of embodiments, dynamic broadcast scope is used, with rules which limit rebroadcasting of locally superfluous video descriptions. To accomplish this, in a preferred implementation, the mobile terminal collects information from the neighboring mobile terminals.

The disclosed inventions, in various embodiments, can provide some or all of the following advantages, among others:

Provides a scalable and cost-effective P2P collaborative streaming process which distributes multimedia content without the high streaming costs and system scalability issues associated with traditional mobile streaming networks.

Enables mobile terminals to pull down portions of a multimedia data stream for sharing with neighboring mobile terminals.

Uses free secondary wireless channels such as WiFi and Bluetooth to form an ad-hoc network over which the pulled portions of the multimedia data stream may be distributed.

Provides good video quality and better utilization of wireless channel.

Achieves fairness in streaming cost sharing by having the mobile terminals take turns pulling multimedia data.

Handles network dynamics in the presence of users joining leaving or transmission failing.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 11 is a graphical illustration of the video bitrate profile of a peer in a network employing the CHUM network for the distribution of one video description.

FIG. 12 is a graphical illustration of the video bitrate profile of a peer in a network employing the CHUM network for the distribution of two video descriptions.

FIG. 13 is a graphical illustration of the video bitrate profile of a peer in a network employing the COSMOS network for the distribution of one video description.

FIG. 14 is a graphical illustration of the video bitrate profile of a peer in a network employing the COSMOS network for the distribution of two video descriptions.

DETAILED DESCRIPTION OF THE PREFERRED EMBODIMENTS

Figure 1:
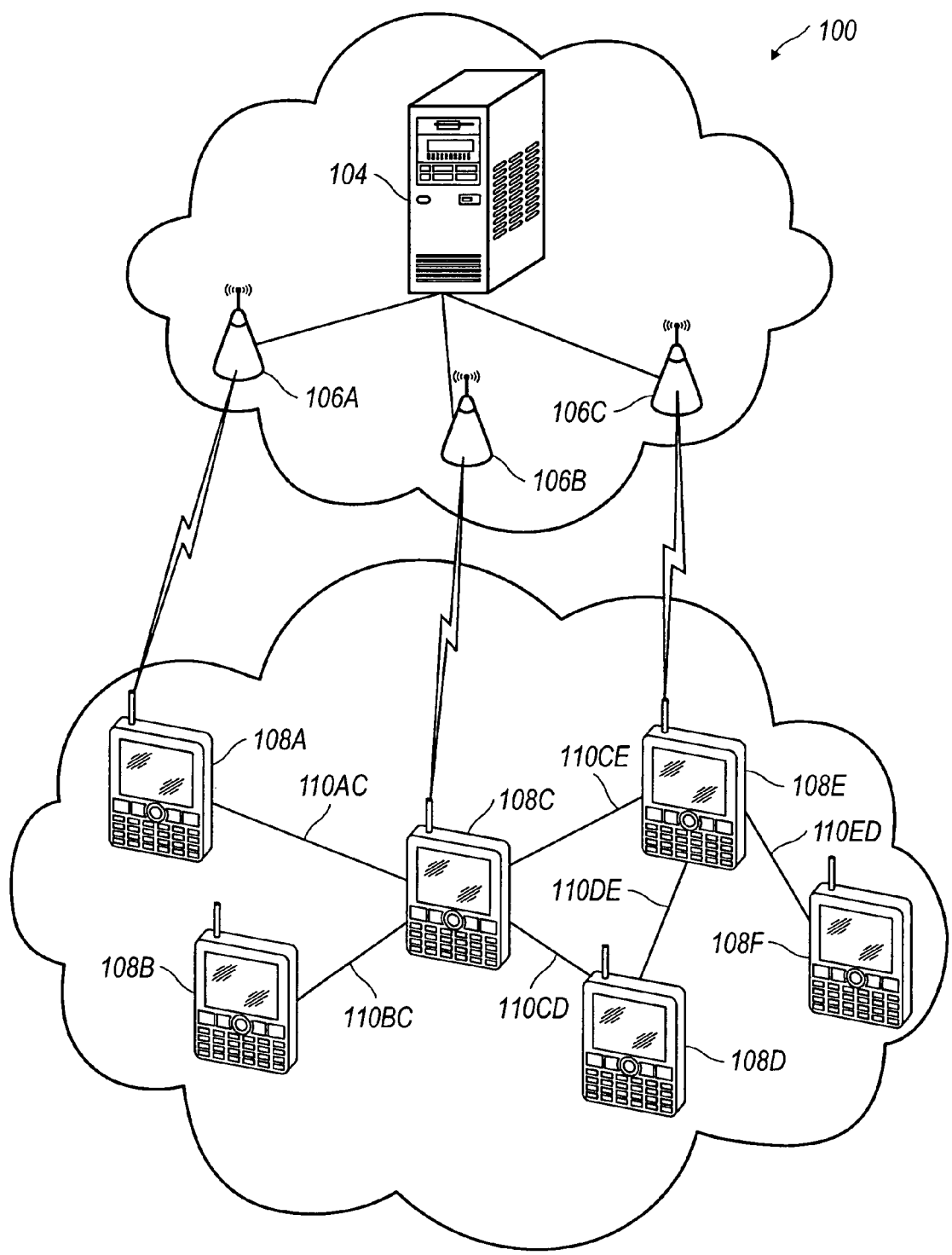
FIG. 1 illustrates an exemplary network for P2P collaborative streaming of content between mobile terminals.

The numerous innovative teachings of the present application will be described with particular reference to the presently preferred embodiment (by way of example, and not of limitation).

A system 100 for collaborative streaming among mobiles (COSMOS) will now be described in greater with respect to FIG. 1. In the embodiment disclosed herein, the COSMOS system 100 is comprised of a first (or "primary") network 102 and a second (or "secondary") network 107. Preferably, the primary network 102 is the Internet and the secondary network 107 is either a Wi-Fi network conforming to IEEE 802.1.1 or a Bluetooth network. As will be more fully described below, the COSMOS system 100 enables the transfer of data, hereinafter referred to as "content," between (a) mobile terminals wirelessly coupled to the primary network 102 and other mobile terminals wirelessly coupled to the primary network 102 and (b) mobile terminals wirelessly coupled to the primary network 102 and mobile terminals that are not wirelessly coupled to the primary network 102.

The primary network 102 is comprised of a wide variety of interconnected computing devices such as personal computers (PCs) and servers. While a large scale network such as the Internet includes a multitude of computing devices, for ease of illustration, FIG. 1 shows only a single such device 104. As disclosed herein, the device 104 is a content provider, for example, a media server, configured for downloading content, for example, streaming video, to requesting devices. Of course, it is fully contemplated that the device 104 may instead be any one of a wide array of devices capable of transferring data to a selected target device. The primary network 102 further includes one or more wireless access points (WAPs) such as base stations. As before, while a large scale network such as the Internet 102 may include a multitude of WAPs of a variety of types, for ease of illustration, FIG. 1 shows only a first base station 106A, a second base station 106B and a third base station 106G. As disclosed herein, a base station or other type of WAP is an access point at which a device such as a mobile terminal may wirelessly access the Internet. Variously, a WAP may be a public WAP accessible to all members of the public without charge or a private WAP, typically maintained by an Internet Service Provider (ISP) who limits access to the Internet through the private WAP to customers who have paid a fee to the ISP. In the embodiment disclosed herein, each of the first, second and third base stations 106A, 106B and 106G are maintained by ISPs.

The secondary network 107 is comprised of any number of mobile terminals capable of establishing (a) a direct or indirect connection with the primary network 106 and/or a selected component thereof; and (b) a direct or indirect connection with other mobile terminals forming part of the secondary network 107. While it is contemplated that the secondary network 107 will typically include a large number of mobile terminals, for ease of illustration, FIG. 1 shows but five such mobile terminals—first mobile terminal 108A, second mobile terminal 108B, third mobile terminal 108G, fourth mobile terminal 108D and fifth mobile terminal 108E. In accordance with the embodiment illustrated in FIG. 1, the first, second and sixth mobile terminals 108A, 108B and 108F are mobile telephones while the third, fourth and fifth mobile terminals 108G, 108D and 108E are personal digital assistants (PDAs) In further accordance with the embodiment illustrated in FIG. 1, various ones of the mobile terminals have established primary channels between themselves and the ISP base stations of the primary network 102, thereby enabling the mobile terminals to become coupled to selected devices of the primary network 102. For example, in FIG. 1, the first mobile terminal 108A is coupled to the content provider 104 through the first ISP base station 106A, the third mobile terminal 108C is coupled to the content provider 104 through the second ISP base station 106B and the fifth mobile terminal 108E is coupled to the content provider 104 through the third ISP base station 106C.

In further accordance with the embodiment illustrated, in FIG. 1, various ones of the mobile terminals have established wireless channels between themselves and certain others of the mobile terminals forming part of the secondary network 104. For example, in FIG. 1, mobile terminal 108A is coupled to the mobile terminal 108C by secondary wireless channel 110AC, mobile terminal 108B is coupled to mobile terminal 108C by secondary wireless channel 110BC; mobile terminal 108C is coupled to mobile terminals 108A, 10813, 108D and 108E by secondary wireless channels 110AC, 110BC, 110CD and 110CE, respectively; mobile terminal 108D is coupled to mobile terminals 108C and 108E by secondary wireless channels 110CD and 110DE, respectively; mobile terminal 108E is coupled to mobile terminals 108C, 108D and 108F by secondary wireless channels 110CE, 110DE and 110EF, respectively; and mobile terminal 108F is coupled to mobile terminal 108E by secondary wireless channel 110EF.

It should be clearly understood that membership in the secondary network 107 is fluid in that mobile terminals may periodically "drop out" or "join" the secondary network 107. To "drop out" of the secondary network 107, the link or links coupling that mobile terminal to all other mobile terminals of the secondary network 107 must be severed, for example, by moving out-of-range, powering-down, switching to another channel or the like. Conversely, to "join" the secondary network 107, a mobile terminal must establish a link with at least one mobile terminal of the secondary network 107, for example, by moving into broadcast range, powering-up, switching to a channel on which the mobile terminals are broadcasting or the like. Importantly, however, a mobile terminal may be a member of the secondary network 107 without establishing a connection with any of the mobile terminals 106A-C through which the primary network 102 may be accessed.

As will be more fully described below, the COSMOS system 100 and an associate method of distributing content, periodically referenced herein as "collaborative streaming", enables mobile terminals that are members of the secondary network to receive a multimedia data stream in its entirety without the need to download the desired data stream in its entirety. To do so, mobile terminals that are within range of a base station pull content from a remotely located server accessible through the base station and distribute the pulled content to mobile terminals with which a secondary communication channel has been established.

Video Distribution

Terminology

In the description that follows, the foregoing notation is employed:

N is a mobile terminal;
N(u) is the set of all mobile terminals neighboring a mobile terminal N;
d is a video description;
S(u,d) is the set of all mobile terminals neighboring the mobile terminal N that are served a video description d by the mobile terminal N;
W(u,d) is the set of neighbors of mobile terminal N that are not served the video description d by the mobile terminal N; and
U(x) is a function that returns a number somewhere between 0 and x.

Video Distribution with Fixed Broadcast Scope

In one embodiment, the COSMOS system 100 employs a fixed broadcast scope protocol, in accordance with this protocol, after pulling a video description d from the content provider 104, mobile terminal N distributes a data packet containing the pulled video description d to its peers, typically, the set of mobile terminals N(u) neighboring the mobile terminal N. Each mobile terminal forming part of N(u)$_1$ checks a Time-To-Live (TTL) field of the data packet received thereby, decrements the value of the TTL field by one and, if the value of the TTL is still greater than one, rebroadcasts the data packet containing the video description d to a next set of neighboring mobile terminals N(u)$_2$. Rebroadcasting would continue in this manner by each set of mobile terminals N(u)$_x$ until the value of TTL is decremented to zero, at which time, no further rebroadcasting of the video description d is conducted.

Returning momentarily to FIG. 1, an example of the use of a fixed broadcast scope when streaming a video description will be briefly described. Assuming that the TTL value for all of the data packets pulled from the content provider 104 is one, mobile terminals 108A, 10813 and 108D pull different video descriptions from the content provider 104. As S=1, each pulled video description is broadcasted one hop from the corresponding puller. In other words, the video description pulled down by the mobile terminal 108A is rebroadcast to the mobile terminal 108C; the video description pulled down by the mobile terminal 108C is rebroadcast to the mobile terminals 108A, 10813, 1081) and 108E; and the video description pulled down by the mobile terminal 108E is rebroadcast to the mobile terminals 108C, 108D and 108F. Thus, while mobile terminals 108A, 108C and 108E each paid for one video description, they received two, three and two descriptions, respectively. Furthermore, mobile terminals 108B, 108D and 108F did not pay for any video descriptions but received one, two and one video description, respectively.

Video Distribution with Dynamic Broadcast Scope

The suitability of using a fixed broadcast scope for distribution of video descriptions in accordance with the techniques disclosed herein depends on the density of mobile terminals in the secondary network 107. More specifically, when the density of mobile terminals is high, the use of a fixed broadcast scope results in the distribution of a large number of redundant video descriptions, thereby causing an unnecessary consumption of available channel bandwidth. Conversely, when the density of mobile terminals is low, the need for repeated pulls of video descriptions may result in increased streaming costs. It is contemplated, therefore, that a distributed broadcast algorithm having a dynamic broadcast scope would efficiently distribute video descriptions among peers having different mobile terminal densities without wasting the channel bandwidth.

Broadly speaking, the use of a dynamic broadcast scope for distribution of video descriptions involves limiting the extent to which a mobile terminal rebroadcast a video description to neighboring mobile terminals based upon the other video descriptions being provided to those mobile terminals. For example, in one application thereof a mobile terminal will not rebroadcast a video description if a number of neighboring mobile terminals are receiving that video description from a different mobile terminal. In order to determine whether to rebroadcast a video description, however, the mobile terminal must collect information from the neighboring mobile terminals.

Figure 2A:
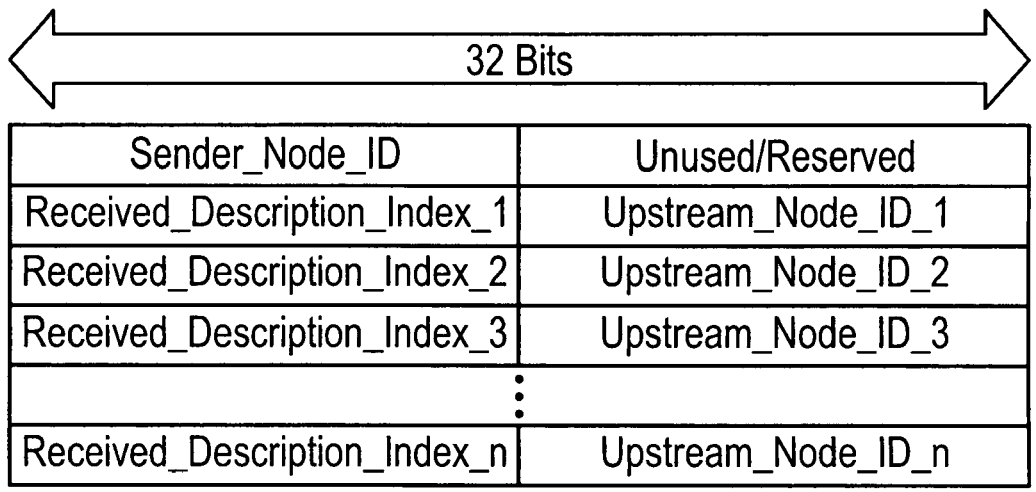
FIG. 2A illustrates a format for a beacon packet broadcast by mobile terminals to one-hop neighboring terminals thereof.

Turning now to FIG. 2, beacon packet 200 containing information which enables a mobile terminal to determine whether to rebroadcast a video description to neighboring mobile terminals will now be described in greater detail. The beacon packet 200 includes a 32-bit header 202, the first 16-bits of which are used to identify the mobile terminal originating the beacon packet 200 and the second 16-bits of which are unused/reserved for future use. The beacon packet 200 further includes N 32-bit data entries, each of which includes a first 16-bit field and a second 16-bit field, which collectively identify all of the video descriptions received by the mobile terminal and the originating location of each of the received video descriptions. More specifically, each data entry 204-1 through 204-N includes a first field 204-1$a$ through 204-1N$a$ that identifies a video description received by the mobile terminal and a second field 204-1$b$ through 204-1Nb that identifies the neighboring mobile terminal which distributed the identified video description to the mobile terminal.

In accordance with the dynamic broadcast scope technique disclosed herein, each mobile terminal will intermittently transmit beacon packets to neighboring mobile terminals, typically, mobile terminals within one hop of the transmitting mobile terminal. The (<Received_Description_Index>, <Upstream_Node_ID>) pair contained in each data block 204-1 through 204-N informs the receiving mobile terminal of the video descriptions that has been received by the neighboring transmitting mobile terminal. In this regard, it is noted that, as a mobile terminal has only one upstream node for a received video description, each entry in the beacon packet is unique.

Figure 2B:
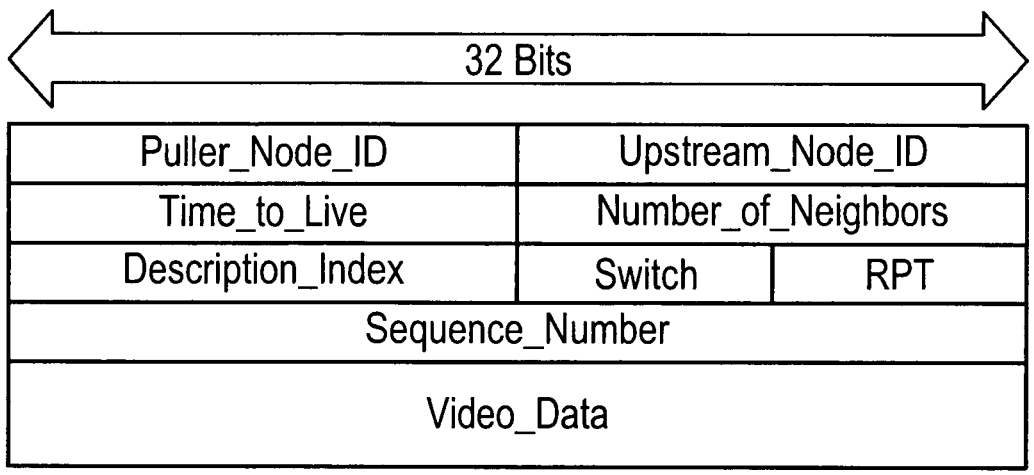
FIG. 2B illustrates a format for video packets suitable for broadcast between mobiles terminals over the network of FIG. 1.

Referring next to FIG. 2B, an example of the format of the data packet 250 used to transport a video description to neighboring mobile terminals will now be described in greater detail. As may now be seen, each data packet 250 includes a first, Puller_Node_ID, field 252; a second, Upstream_Node_ID, field 254; a third, Time_to_Live, field 256; a fourth, Number_of_Neighbors, field 258; a fifth. Description_Index, field 260; a sixth, Switch, field 262; a seventh, RPT, field 264; an eighth, Sequence_Number, field 266 and the video description 268. From the Description_Index and Upstream_Node_ID fields 260 and 254, a mobile terminal which of its neighbors is broadcasting the data packet 250. In the event that the mobile terminal receives the same video description from multiple neighbors, the ID of the neighboring mobile terminal having the earliest arrival time is placed in the Upstream_Node_ID field 254.

It should be noted that the upstream node for a data packet such as the data packet 250 is either a source node that previously pulled the corresponding video description from the content provider 104 or an intermediate rebroadcasting node. If the node is the source node and has some neighbors, previously identified from the beacon packet 200, the node determines whether or not to rebroadcast the received data packet in accordance with the following:

Presuming that it is the first time that non-pulling node u has received a data packet 250 containing the video description d. If more than a certain fraction of the nodes neighboring node u have already received the video description d from nodes other than node u, the non-pulling node u does not rebroadcast the received data packet 250 containing the video description d. For example, the non-pulling node u evaluates the percentage X of the potential beneficiaries that can be served by node u in accordance with Equation (1), below.

$$\chi = |S(u,d) U W(u,d)|/|N(u)| \tag{1}$$

If the number $\chi$ of potential beneficiaries that can be served by the node u is less than threshold value $X_{Th}$, then the node u does not rebroadcast the data packet. There are two extreme cases of the value $X_{Th}$ that need to be considered. More specifically, if $X_{Th}=0$, the system will work similar to a COSMOS system with a fixed broadcast scope and wireless medium contention may occur if the network is too dense. On the other hand, if $X_{Th}=1$, then only pullers broadcast descriptions and there are no rebroadcasts. As a result, the setting, of $X_{Th}$ is a trade-off between wireless medium traffic and streaming costs. In this regard, it should be noted that, as their values continuously change due to network dynamics, N(u), S(u,d) and W(u,d) may all be moving ng averages.

To avoid collisions when rebroadcasting a video packet, a node will delay the rebroadcast for a period of time. To maximize the number of nodes benefited by any particular rebroadcast, nodes with larger $\chi$'s rebroadcast their video packets first. Accordingly, the rebroadcast delay $T_D$ for a node is:

$$T_D = U(\rho \times (1-\chi)) \tag{2}$$

where $\rho$ is the maximum rebroadcast delay in the system. Thusly, upon receiving a data packet, a node suppresses its rebroadcast: schedule of the received video description for delay period $T_D$.

A maximum limit S on the broadcast: scope of a packet limits the source-to-peer (S2P) delay of the secondary network 107. For fixed broadcast scope distributions of video descriptions. TTL is initially set to S and decremented by one for each hop. The nodes are then permitted to rebroadcast a video description only if TTL is greater than zero and $\chi \geq X_{Th}$. For example, returning momentarily to FIG. 1, if S is set to 2 and $X_{Th}$ is set to 0.5, the mobile terminals 108A, 108C and 108E pull video descriptions $d_A$, $d_C$ and $d_E$, respectively. When a peer receives a video description, $\chi$ is evaluated to determine whether to the received video description should be rebroadcast. For example, the mobile terminal 108C receives the video description $d_A$ in the first broadcast from puller A. From beacon messages, the mobile terminal 108C determines that neighboring mobile terminals 10813, 108D and 108E are not receiving the video description from any peer. Accordingly, $\chi=0.75$ for the mobile terminal 108C. As the value of $\chi$ (0.75) is greater than the value of $X_{Th}$ (0.5), the mobile terminal 108C rebroadcasts the video description $d_A$.

However, when the mobile terminal 108D receives the video description $d_C$ from neighboring mobile terminal 108C, it determines that the mobile terminal C is the puller and that mobile terminal 108E is already receiving the video description dC from the mobile terminal 198D. The mobile terminal 1081) evaluates $\chi=0$ and discards the rebroadcast operation to save wireless channel bandwidth. Thusly, the mobile terminals 108A, 108C and 108E are pullers paying for one video description and enjoying three video descriptions while the mobile terminals 108B, 108D and 108F are passive receives enjoying three, three and one video description, respectively.

Cost Sharing and Group Dynamics

As previously set forth, as mobile terminals randomly select video descriptions to pull from the content provider, it is entirely possible that two mobiles will pull and broadcast the same video description to each other. Although this type of redundancy reduces the likelihood of failure, any such advantages are outweighed by the increased streaming cost and reduced bandwidth that results. Accordingly, it would be beneficial for one of the mobile terminals to instead pull another description, thereby improving video quality and bandwidth utilization. As it is beneficial to more terminals, it is generally preferred that the mobile terminal with more neighboring mobile terminals broadcast the pulled video description. The value of the Number_of_Neighbors field 258 in the data packet 250 containing the video description to be broadcast by the respective terminals is used to resolve which pulling terminal should broadcast the video description. En the event of a tie, the pulling terminal with the largest value in the Puller_Node_ID field 252 will broadcast the video description. The peers without the full video descriptions would randomly choose any of its missing descriptions to pull. If the peer finds that all of the video descriptions are already available from neighboring terminals over the secondary broadcast channel, the terminal would become a passive receiver.

As the number of terminals in the secondary network 107 increases, some of the terminals may no longer need to pull any video descriptions and may instead become passive receivers that only receive video descriptions from other terminals. As this may result in unequal sharing of the cost of acquiring the video stream, the protocol employed in the secondary network 107 of the COSMOS system 100 has a mechanism which results in the pulling terminals and the passive terminals exchanging their roles when a pulling terminal has been downloading video data for some time.

A certain time TS seconds before a pulling terminal would like to stop pulling video descriptions, the pulling terminal sets the switch flag 262. The pulling terminal then advising the other terminals of its intention to stop pulling by setting RPT (residual pull-time) to TS. The packet is broadcast within scope S. A passive terminal that receives the video packet with the switch flag 262 set starts a random timer with U(TS). If, by the expiration of U(TS), the passive terminal has not received the corresponding video description from the terminals neighboring the passive terminal, it becomes a puller of the video description by broadcast the description it pulls. In other words, the passive terminal with the earliest timer becomes the pulling terminal which replaces the formerly pulling terminal.

Before a pulling terminal leaves the secondary network 107, it notifies neighboring terminals so that they can contend to pull the video description for sharing. The departing pulling terminal sets the switch flag 262 of the video packet 250 and sets RPT to 0. Upon receiving the data packet 250, the neighboring terminals start a random timer of value U(L) where L is some constant. What results is similar to the role switching mechanism.

The COSMOS system 100 is robust to peer failure since some descriptions may be duplicated. If a pulling terminal fails, the same description can be supplied by other neighboring terminals. Neighboring terminals can buffer and order the video packets received according to their Description_Index and Sequence_Number fields 260 and 266 of the data packet. By doing so, duplicate packets can be identified and removed. If a peer finds that some of its video descriptions have been missing for a time, for example, as a result of a terminal failure, the terminal may begin pulling and sharing the video descriptions after a certain random timer L+U(L) where L and L are constants.

A simulation may be used to compare the relative performance of the COSMOS and CHUM networks. In this simulation, peers were randomly placed in a 100 unit by 100 unit area with each peer having a power range of 15 units. Peers enter the system at a Poisson arrival rate of $\lambda$ requests/unit time Normalizing the time such that $\mu=1$ request/unit time and presuming that a peer does not fail beforehand, each peer remains in the system for a mean time of $1/\mu$. A peer may fail with a rate of $f/(\mu+f)$. Therefore, at stead state, the average number of peers in the system is $N=\lambda/(\mu+f)$ and the probability that a peer will fail is $f/(\mu+f)$.

In the description that follows, the bandwidth is normalized such that a full stream of a video clip has a bandwidth of 1. For both the protocols employed in the COSMOS and CHUM network, an MDC of D descriptions with $D \geq 1$ was utilized so that each video description has a bandwidth less than that of the full stream. To account for MJDC coding inefficiency, each video description was considered to have a bandwidth $(1+\delta)/D$, where $\delta$ is a bandwidth dilation factor. An event-driven simulation was implemented to study the system and all data was taken at steady state. Finally, pulling time and transmission time were assumed to be zero.

Metrics

A series of performance metrics enable the evaluation of the performance of both the COSMOS protocol with a fixed broadcast scope and the COSMOS protocol with a dynamic broadcast scope in distributing video descriptions to mobile terminals using a secondary broadcast channel. These performance metrics include (1) Receiving Channel Traffic; (2) Total Channel Traffic; (3) Delay; (4) Cost; (5) Cost Fairness; (6) Video Bitrate; and (7) Bitrate Fluctuation. As will be more fully described below, each of these performance metrics were evaluated for a node i where $T_i$ is the system time for the node i, t is an instant in the lifetime of node i in the system and $N_{ex}$ is the number of nodes examined.

Receiving Channel Traffic

The term "Receiving Channel Traffic" (RCT) refers to the bandwidth required for a node to receive data for a node through the secondary broadcast channel and may be determined from the following relationship:

$$RCT = \Sigma_i \int_{Ti} V_i(t)dt / \Sigma_i T_i$$

where $V_i(t)$ is the bandwidth that node i receives at time t.

Total Channel Traffic

The term "Total Channel Traffic" (TCT) refers to the bandwidth required for the node and in may be determined from the following relationship:

$$TCT = \Sigma_i \int_{Ti} B_i(t)dt / \Sigma_i T_i$$

where $B_i(t)$ is the sum of bandwidth that node I broadcasts and receives at time t.

Delay

The term "Average Delay" ($D_{AV}$) refers to the minimum number of broadcasts which must occur before a node receives a particular video description and may be determined from the following relationship:

$$D_{av} = \Sigma_i \int_{Ti} H_i(t)dt / \Sigma_i T_i$$

where $H_i(t)$ is the maximum delay of all of the video descriptions received by node i at time t.

Cost

The term "Average Cost" ($C_{AV}$) refers to the streaming cost per unit time for all nodes and may be determined from the following relationship:

$$C_{AV} = \Sigma_i \int_{Ti} P_i(t)dt / \Sigma_i T_i$$

where $P_i(t)$ is the total bandwidth of the video descriptions pulled by node i at time t.

Cost Fairness

The term "Cost Fairness" (CF) refers to the streaming cost per unit time for node i and may be determined from the following relationship:

$$CF = \int_{Ti} P_i(t)dt / T_i$$

Jain's fairness index may be used to further define cost fairness in accordance with the following:

$$CF = (\Sigma_i C_i)^2 / N_{ex} \Sigma_i C_i^2$$

Video Bitrate

The term "Video Bitrate" (VB) refers to the effective video description bandwidth received per unit time for node i and may be determined from the following relationship:

$$VB = \Sigma_i \int_{Ti} P_i(t)dt / \Sigma_i T_i$$

where $R_i(t)$ is the effective description bandwidth that node i receives at time t.

Bitrate Fluctuation

The term "Bitrate Fluctuation" (BF) refers to the coefficient of variation $\sigma_{R_i}/\mu_{R_i}$ for node i and may be determined from the following relationship:

$$BF = \Sigma_i (\sigma_{R_i}/\mu_{R_i}) / N_{ex}$$

Experiments

Two cases, the first being D=1 and the second being D=2 shall be considered in the foregoing experiments. Further, unless otherwise stated, the baseline parameters for the foregoing experiments are as follows:

f=0.1 request/unit time);
λ+100 requests/unit time
S=2; and
$X_{Th}$=0.66.

Figures 3, 4:
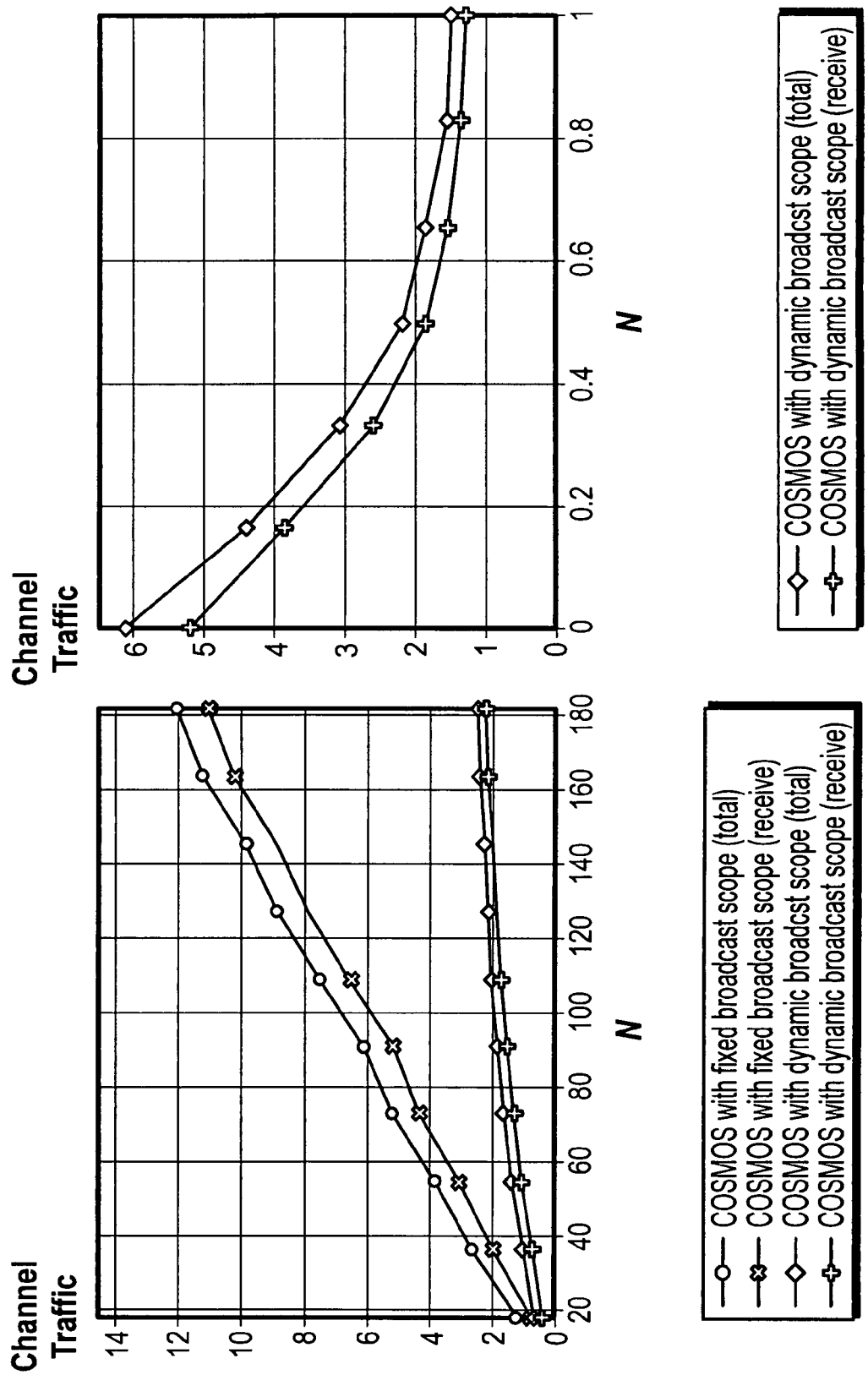
FIG. 3 is a graphical illustration comparing channel traffic is a function of number of peers for fixed broadcast scope and dynamic broadcast scope applications of the COSMOS network.
FIG. 4 is a graphical illustration of channel traffic as a function of broadcast threshold for a dynamic broadcast scope application of the COSMOS network.

Referring next to FIG. 3, channel traffic as a function of the average number of peers for a secondary network, for example, the secondary network 107, employing the COSMOS distributed broadcast protocol with both a fixed broadcast scope and a dynamic broadcast scope will now be described in greater detail. As may now be seen, FIG. 3 confirms that, as the total number of nodes neighboring the distributing a video description increases, both the total and receiving traffic rises much more quickly when a fixed broadcast scope is employed in conjunction with the COSMOS protocol. A review of FIG. 3 further confirms that receiving and total traffic tend to increase at roughly the same rate and that the available bandwidth is consumed by broadcasting of received packets.

Importantly, FIG. 3 clearly shows that the channel traffic for a secondary network employing the COSMOS distributed broadcast protocol with a fixed broadcast scope, an unnecessary number of broadcast operations are conducted when there are a large number of mobile terminals in close proximity to one another. As the density of the mobile terminals in the secondary network increases, an increasing number of the terminals will rebroadcast increasing numbers of duplicate video descriptions that were previously broadcast, thereby unnecessarily wasting considerable amounts of bandwidth and increasing the likelihood of contention between the mobile terminals. In contrast, when a dynamic broadcast scope is employed with the used in conjunction with the COSMOS distributed broadcast protocol, a mobile terminal is more likely to broadcast a video description when greater numbers of the neighboring mobile terminals are not served by other mobile terminals. As a result, many unnecessary rebroadcasts are avoided and more bandwidth remains available for other uses.

Referring next to FIG. 4, channel traffic as a function of broadcast threshold for a secondary network employing the COSMOS distributed broadcast protocol with dynamic broadcast scope will now be described in greater detail. FIG. 4 establishes that channel traffic decreases as broadcast threshold increases. When the broadcast threshold is zero, the COSMOS distributed broadcast protocol with dynamic broadcast scope becomes increasingly similar to that: of a fixed broadcast scope. As before, channel traffic is high due to unnecessary rebroadcasts of video descriptions. In contrast, when the broadcast threshold is one, only pullers broadcast descriptions and there are no description rebroadcasts. As a result, the channel traffic is low.

In addition, we can deduce the bandwidth requirement of a peer from the figures. Let B W be the actual bandwidth of a video clip. Since the bandwidth of a full stream video clip is normalized to 1 in the simulation, the real bandwidth requirement of a peer equals to (Total Channel Traffic×BW). As the COSMOS scheme with a fixed broadcast scope has channel contention problems, we leave out the results of this scheme and consider the COSMOS scheme with dynamic broadcast scope for the following experiments.

Figures 5, 6:
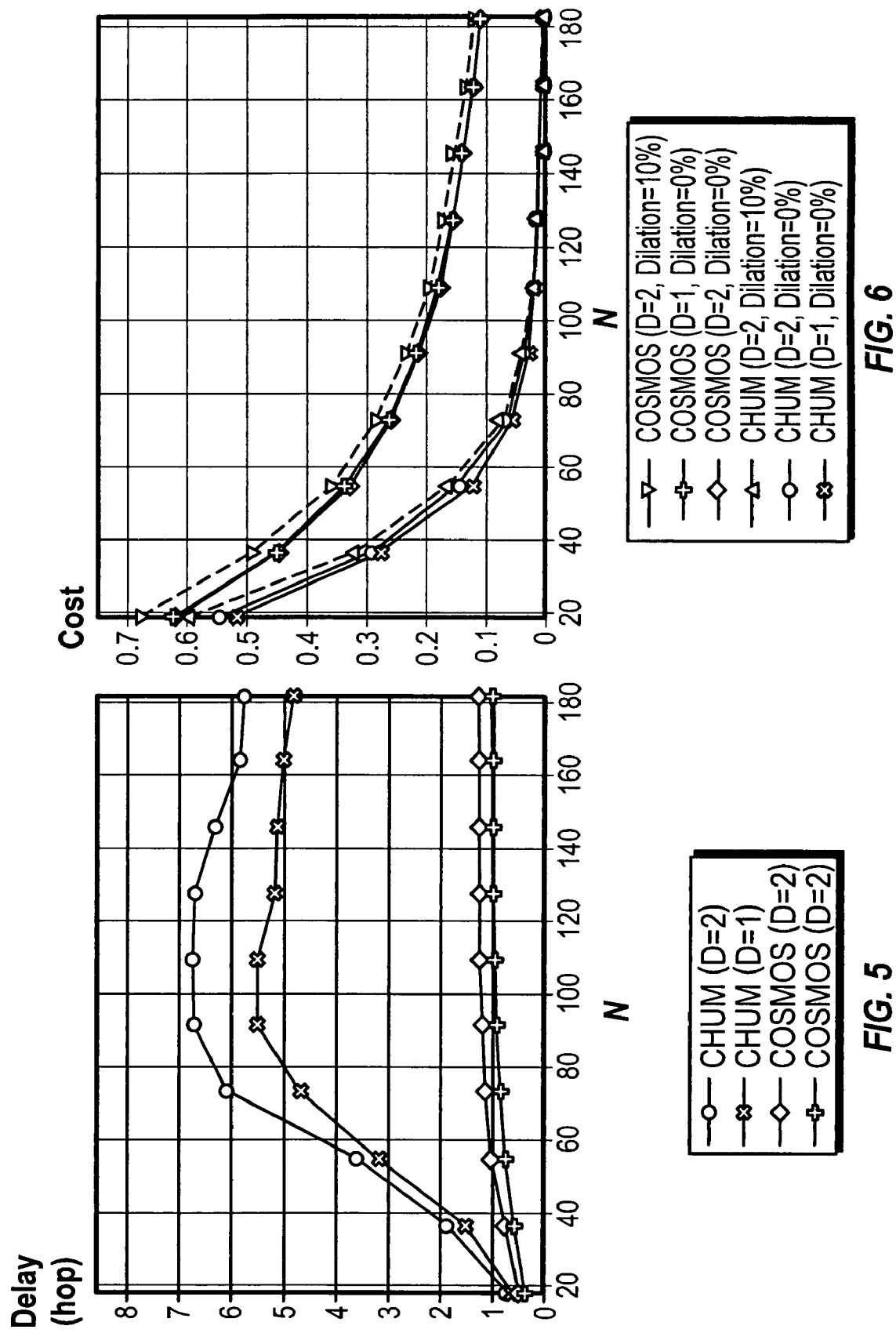
FIG. 5 is a graphical illustration comparing average delay as a function of average number of peers for the CHUM and COSMOS networks.
FIG. 6 is a graphical illustration comparing average cost as a function of average number of peers for the CHUM and COSMOS networks.

FIG. 5 compares the performance of COSMOS with CHUM in terms of delay as N increases. Clearly, COSMOS has a much lower delay. In COSMOS, the video packets are broadcasted within the scope S and hence delay is limited. For CHUM, the video data is forwarded until it reaches leaf nodes of the forwarding tree. Accordingly, COSMOS has a better delay performance than CHUM.

When the CHUM network is small, its average tree height and the average delay increases with N. Nevertheless, average delay drops slightly beyond a certain value. This is because when the area becomes very crowded, the average path length (in terms of number of hops) to puller would not increase any further or even reduce due to shortest path routing. As a result, the delay of CHUM decreases when we take average over all users.

Furthermore, the number of video descriptions D would affect the delay performance. This is because a node receives video descriptions from different pullers. The node may have different distances (in terms of number of hops) to the pullers. Since we consider the maximum delay of all descriptions received, more descriptions would lead to a higher resultant delay. As a result, the average delay increases with the number of video descriptions.

The average costs for COSMOS and CHUM are plotted in FIG. 6. As the inefficiency of MDC is significant for the cellular bandwidth pulled and affects the streaming cost, we also consider bandwidth dilation with a dilation factor δ 1-% for the schemes with the number of video descriptions D=2. In general, the average cost increases by about 10% when compared to the schemes without bandwidth dilation.

When the number of users increases, more peers collaborate to pull video data and the cost is shared among them. At any instant of time, there is one peer pulling each video description in a CHUM network and it does not have duplicate packets. In contrast, as COSMOS is a mesh approach to distributing multimedia data, some pullers may download replicate packets simultaneously. Consequently, the average cost of CHUM drops much faster than that of COSMOS as N increases.

Figures 7, 8:
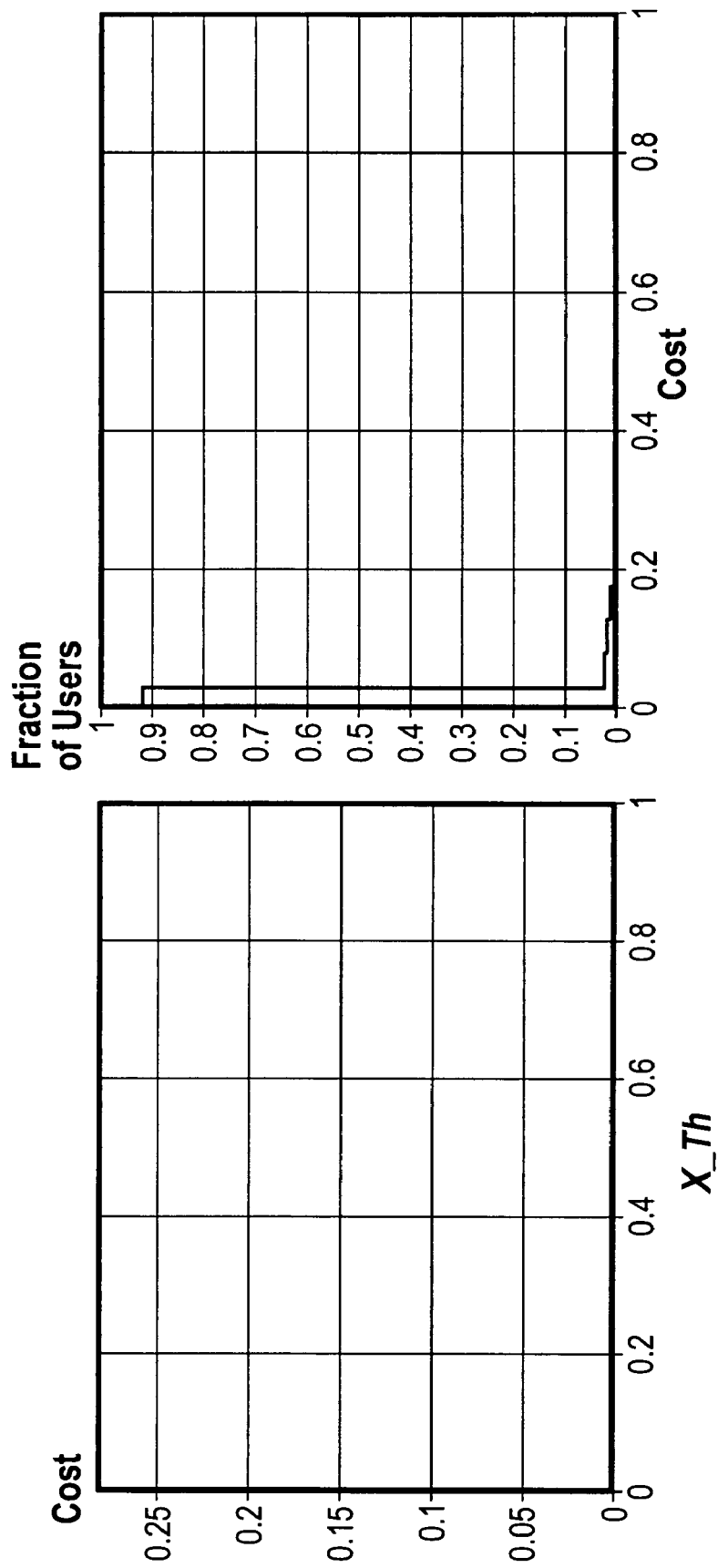
FIG. 7 is a graphical illustration of average cost as a function of broadcast threshold for the COSMOS network.
FIG. 8 is a graphical illustration of cost distribution among peers in a network employing the CHUM network.

FIG. 7 shows the average cost of COSMOS against broadcast threshold $X_{TH}$. The steaming cost increases with the broadcast threshold XTH. When XTH=1, only pullers broadcast video descriptions and there is no video description rebroadcast. Accordingly, it works similar to COSMOS with a broadcast scope S=1. More pullers are required and, as a result, higher stream costs are incurred. Conversely, for XTH=0, the system works like the COSMOS scheme with a fixed broadcast scope. Pullers broadcast descriptions which cover the nodes S=2 hops away from the pullers. Therefore, both the number of pullers and the streaming costs are reduced.

However, since only one peer pulls a video description in the CHUM network at the same time, the cost is distributed to only a few peers. Some peers may not have a chance to contribute and pull anything before leaving the system. As a result, the cost: charged to peers are inconsistent. FIG. 8 shows a histogram which illustrates the cost distribution in the CHUM network. During the simulation period, the streaming cost is only distributed to a few peers. Most of the peers need to pay for a very low cost only, or do not even need to pay, while only a small proportion of peers pay for most of the streaming cost of the entire system. On the contrary, in the COSMOS system, many peers collaboratively pull video descriptions simultaneously. As a result, the streaming cost can be distributed among more peers, thereby attaining a greater degree of fairness. This result may be seen by reference to the histogram for cost distribution in the COSMOS network shown in FIG. 9.

Figures 9, 10:
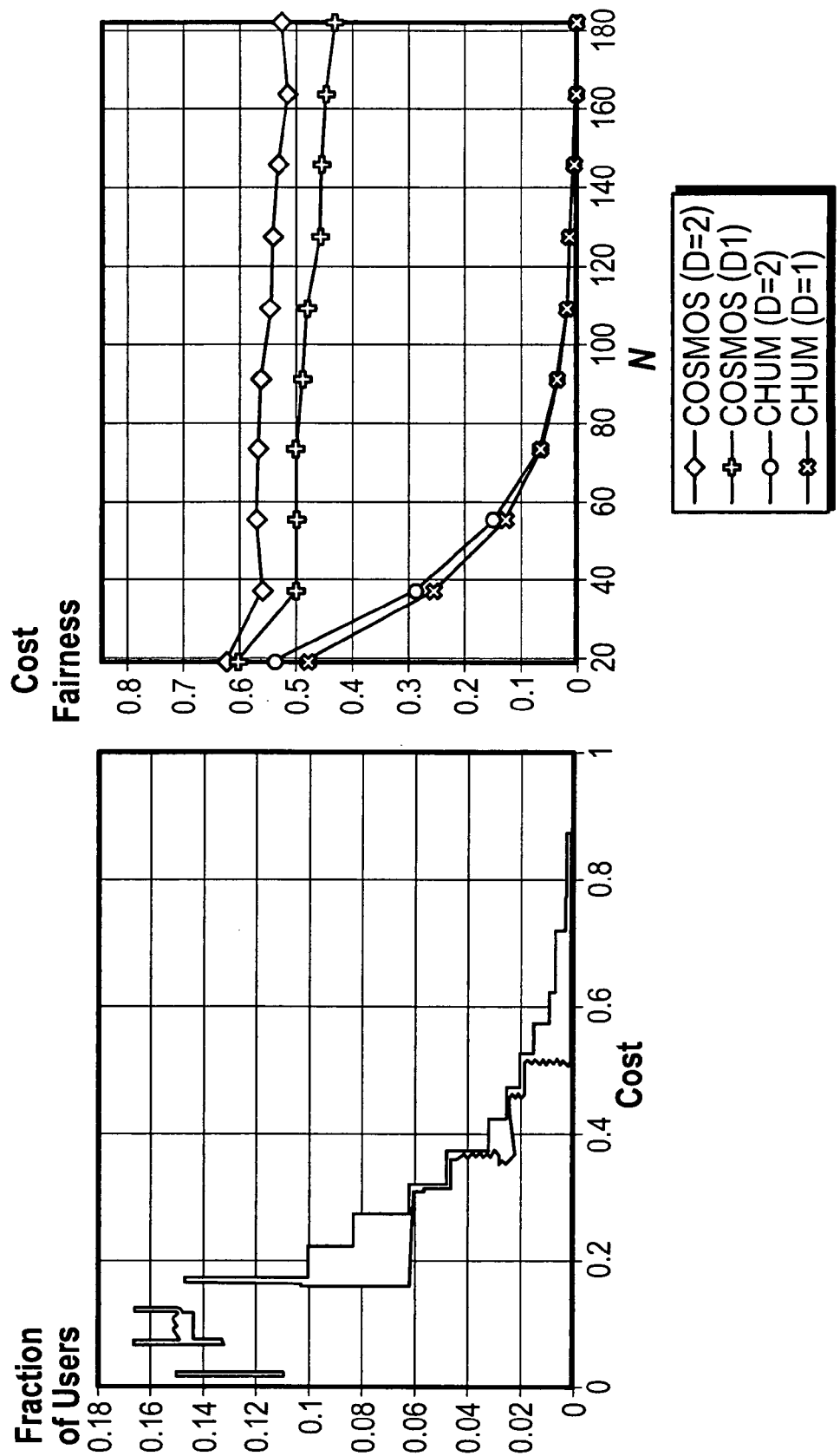
FIG. 9 is a graphical illustration of cost distribution among peers in a network employing the COSMOS network.
FIG. 10 is a graphical illustration comparing cost fairness as a function of average number of peers for the CHUM and COSMOS network.
Figures 15, 16:
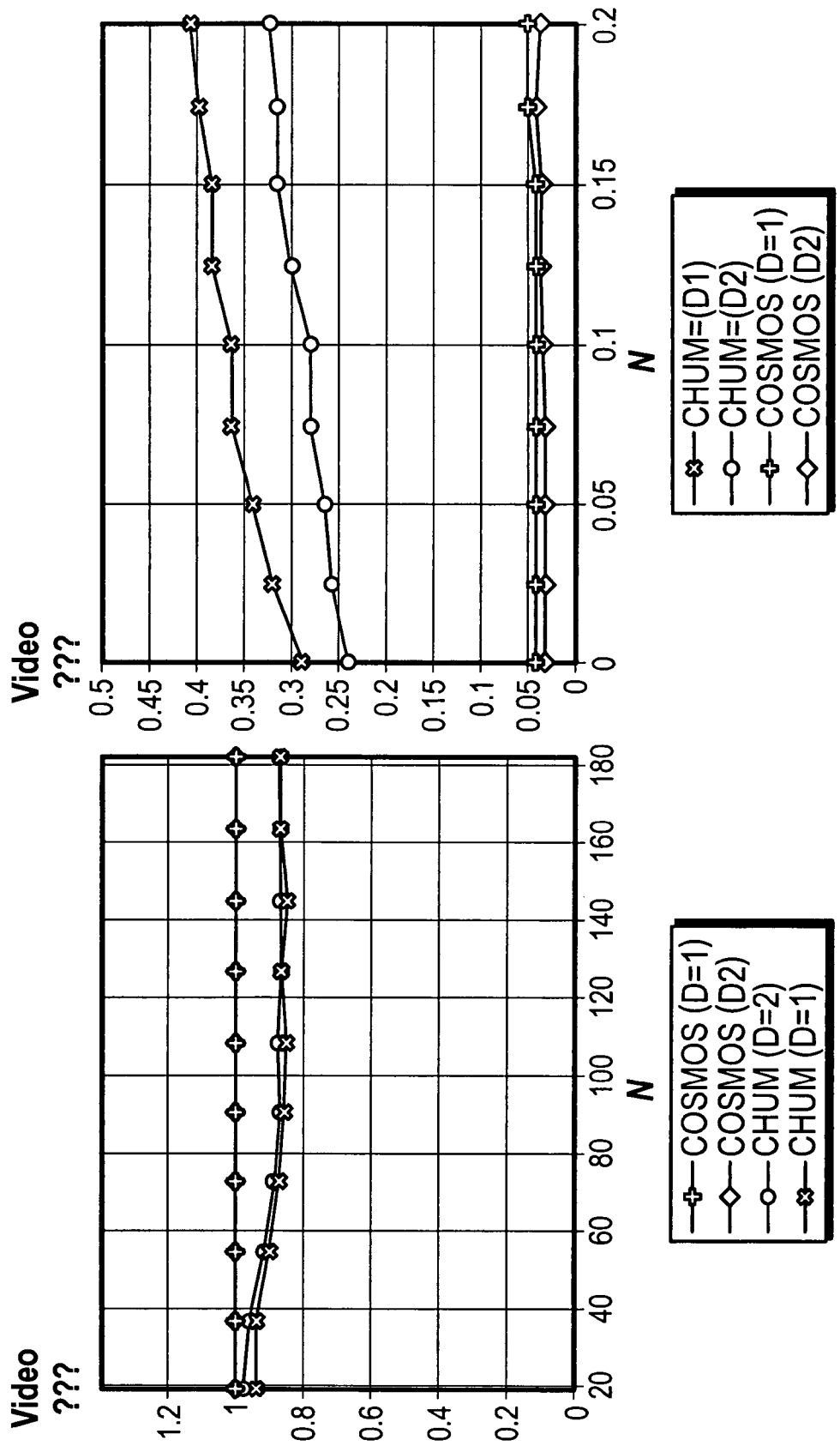
FIG. 15 is a graphical illustration comparing the average video bitrate as a function of the average number of peers for the CHUM and COSMOS networks.
FIG. 16 is a graphical illustration of the average bitrate fluctuation as a function of peer failure rate for the CHUM and COSMOS networks.

Furthermore, with different average number of peers, we compare the fairness in cost sharing between CHUM and COSMOS. This is illustrated in FIG. 10. Jain's fairness index, which has a value between 0 and 1, is used as an indicator for cost fairness. The larger the fairness index is, the fairer the streaming cost is distributed. As the cellular streaming cost is more biased towards a few hosts, CHUM has a lower fairness when compared to COSMOS. Moreover, the fairness in cost sharing changes with the number of video descriptions. When there are more video descriptions in the system, more pullers are required to pull a full set of descriptions from the content provider. Therefore, more peers contribute to pulling different video descriptions and the streaming cost can be distributed to a larger number of users. As a result, the fairness in cost sharing increases with the number of video descriptions D.

Despite our protocol to reduce video description duplication in the network, certain unavoidable video description redundancies remain. This is, in fact, an advantage as it leads to higher failure tolerance. Furthermore, the use of MDC minimizes the stream disruption when peer fails. The neighbors of the failure peer would experience the loss of one video description instead of the entire video clip as in CHUM. Hence, the video bitrates of peers can be kept rather steady. In CHUM, one a peer fails, some downstream nodes may suffer discontinuity, a condition which adversely affects bitrate.

FIGS. 11, 12, 13 and 14 plot four video bitrate profiles of peers in CHUM and COSMOS. The video bitrate obtained thereby is the effective bitrate received for video de+coding. The figures show that there are some bitrate drops which are due to peer departures and peer failures. A peer leaving causes a smaller gap while a peer failure results in a bigger gap. In general, CHUM peers have more bitrate drops during their system times. There is only one puller for each description. Due to a peer leave or failure, its downstream nodes cannot receive video data and they suffer some loss of video data. In contrast, for COSMOS systems, there are fewer bitrate drops because the video data delivery is based on mesh topology instead of tree topology as in CHUM. Video description duplication reduces the effect of peer leaves and failures. Even though other nodes sometimes cannot supply duplicate video descriptions, the peer experiences the loss of only one video description. Especially, COSMOS scheme with D=2 can bear the loss of a video description. This is because the loss does not affect the continuity of the video since a usable quality is maintained whenever any video description is correctly received. Hence MDC would provide better failure resilience to the system.

We show in FIG. 17 the average bitrate received per node. Clearly, COSMOS achieves higher video bitrate than CHUM. This is because there is only one source (puller) for each video description, in a CHUM network, while COSMOS is a mesh network with multiple pullers. COSMOS peers may achieve duplicate video descriptions and this reduces the effect of peer leaves and failures. Hence, higher effective video bitrate can be achieved. For COSMOS system, as the bandwidth of each video description is defined as 1/D, the number of descriptions received equals (D×Video Bitrate). Furthermore, we show in FIG. 17 the bitrate variation as failure rate f increases. CHUM suffers from a larger bitrate fluctuation. The bitrate for COSMOS is steadier due to inheritance redundancy and MDC.

According to various disclosed embodiments there is provided: a method for streaming data among terminals, comprising: pulling a portion of a data stream over a primary channel; determining which nearby terminals require said pulled portion of said data stream; and distributing, over a second channel, said pulled portion of said data stream to said neighboring terminal requiring said pulled portion of said data stream.

According to various disclosed embodiments there is provided: a method for streaming data among terminals, comprising: in multiple user terminals, at about the same time, pulling respective portions of a data stream through a primary wireless channel; and in ones of said user terminals, finding ones of said terminals which require said pulled portion of said data stream and are within a common peer-to-peer network; and distributing, over a second wireless channel, said pulled portion of said data stream to terminals which require it.

According to various disclosed embodiments there is provided: a system for streaming data, comprising: a content provider; a first terminal coupled to said content: provider over a first network; and at least: one neighboring terminal coupled to said first terminal over a second network, and therethrough to said content provider; said first terminal being configured to (a) intermittently pull portions of a data stream from said content: provider over said first network, and (b) broadcast said pulled portions of said data stream to said at least one neighboring terminal over said second network.

According to various disclosed embodiments there is provided: a wireless network, comprising: a content provider; a first sub-network of at least one mobile terminal; and a second sub-network of at least one mobile terminal; each mobile terminal of said first sub-network coupled to said content provider and at least one other mobile terminal of either said first sub-network or said second sub-network; each mobile terminal of said second sub-network coupled to at least one mobile terminal of said first sub-network; each mobile terminal of said first sub-network configured to randomly pull video descriptions from said content provider and distribute said pulled video descriptions to said at least one mobile terminal coupled thereto; and each mobile terminal of said second sub-network configured to receive video descriptions from said at least mobile terminal of said first sub-network coupled thereto.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. The variations indicated above are just a few examples; following are some additional examples, but many others are possible.

For example, in the preferred embodiment, all of the nodes of the secondary network 116 are mobile devices, specifically, a combination of mobile telephones and PDAs, but alternately any other mobile device capable of receiving data over the secondary network 116 such as portable televisions (TVs), digital video device (DVD) players and notebook, laptop or tablet computers may be a node of the secondary network 116. Further, while, in the preferred embodiment, all of the nodes of the secondary network 116 are mobile devices, alternately one or more of the nodes may be a device such as a desktop computer that is not designed for movement while in normal use.

Further, in the preferred embodiment, the content provider 104 is a media server coupled to the ISP base stations 106A, 106B and 106C over the primary network 102. Alternately, the content provider 104 may be a storage facility or any other type of device or system capable of delivering data to the ISP base stations 106A, 10613 and 106C in either a unilateral manner or upon receipt of a request therefor. Moreover, the content providers may be integrated into the ISP base stations 106A, 106B and 106C themselves while the data transfers may be accomplished over either direct or indirect couplings between the devices.

Still further, the communications channel between the mobile terminals and the base stations was described as a "cellular" channel a term periodically associated by some with certain types of voice communication systems and/or protocols. However, it should be clearly understood the foregoing embodiment was provided, purely by way of example and it is fully contemplated, however, that a wide variety of other types of wireless communication techniques and/or protocols, including, but not limited to, satellite-based systems, voice over internet protocol (VOIP) systems, personal communication systems (PCS), global system for mobile communications (GSM), time division multiple access (TDMA) and/or code division multiple access (CDMA) may be used in its stead. If desired, the primary and secondary networks 102 and 107 may even employ wireline systems, for example, optical or plain-old-telephone (POT) systems. Likewise, the mere reference of the secondary channel as being either an IEEE 802.11 or a Bluetooth channel should not be interpreted as limiting the present disclosure to those particular channels. Instead, it is fully contemplated that the secondary channel may be any communication channel, preferably one that avoids interfering with the channel employed by the pulling terminals during the acquisition of data from the content provider.

Of course a wide variety of data security architectures can be used to protect copyright owners' rights in peer-to-peer networks. For example, the data being streamed may not be the original, image data, but instead may have been transformed so that a decryption process is required for comfortable viewing.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC Section 112 unless the exact words "means for" are followed by a participle.

The claims as filed are intended to be as comprehensive as possible, and NO subject matter is intentionally relinquished, dedicated, or abandoned.

What is claimed is:

1. A method, comprising:
    receiving, by a first terminal, from a device, a first portion of a data stream, using a first channel;
    determining, by the first terminal, whether to distribute the first portion of the data stream to a second terminal, wherein the second terminal is equipped to communicate with the first terminal via a second channel and the second terminal has not received the first portion of the data stream;
    based at least in part on the determining whether to distribute the first portion of the data stream, distributing, by the first terminal, via the second channel, the first portion of the data stream to the second terminal, wherein the determining comprises:
        calculating, by the first terminal, a first proportion of terminals communicating with the first terminal which can receive the first portion of the data stream from the first terminal; and
        determining, by the first terminal, that the first proportion of terminals is greater than or equal to a pre-determined threshold;
    receiving, by the first terminal, a second portion of the data stream;
    calculating, by the first terminal, a second proportion of terminals communicating with the first terminal which can receive the second portion of the data stream from the first terminal;
    determining, by the first terminal, that the second proportion of terminals is lower than the pre-determined threshold; and
    based at least in part on the determining that the second proportion of terminals is lower than the pre-determined threshold, determining, by the first terminal, to not send a packet containing the second portion of the data stream to the second terminal.

2. The method of claim 1, wherein distributing by the first terminal via the second channel comprises distributing by the first terminal to the second terminal via a peer-to-peer connection.

3. The method of claim 1, wherein receiving by the first terminal comprises responding by the first terminal to the second terminal via a cellular network's data service.

4. The method of claim 1, wherein receiving by the first terminal using the first channel is more expensive than distributing by the first terminal to the second terminal via the second channel.

5. The method of claim 1, wherein the receiving, determining, and distributing are performed by the first terminal for a plurality of randomly distributed portions of the data stream.

6. The method of claim 1, wherein determining whether to distribute the first portion of the data stream to the second terminal comprises determining, by the first terminal, whether the first portion of the data stream has made more than a predetermined number of hops through a network.

7. The method of claim 6, wherein:
    determining whether the first portion of the data stream has made more than the predetermined number of hops through a network comprises determining, by the first terminal, that a first time-to-live field associated with the first portion of the data stream is greater than 0; and
    distributing the first portion of the data stream to the second terminal comprises:
        decrementing, by the first terminal, the first time-to-live field associated with the first portion of the data stream by 1; and
        sending, by the first terminal, a packet containing the first portion of the data stream and the first time-to-live field to the second terminal.

8. The method of claim 7, further comprising:
    determining, by the first terminal, that a second time-to-live field associated with the second portion of the data stream has reached 0; and
    based at least in part on the determining that the second time-to-live field associated with the second portion of the data stream has reached 0, determining, by the first terminal, to not distribute the second portion of the data stream to the second terminal.

9. A method, comprising:
    receiving, by a first device, from a second device, a first portion of a data stream, through a wireless channel;
    determining, by the first device, whether to distribute the first portion of the data stream to a third device based at least in part on determining whether a density of devices which have received the first portion of the data stream has exceeded a threshold, wherein the determining whether the density of devices has exceeded the threshold comprises:

calculating, by the first device, a first proportion of devices communicating with the first device which can receive the first portion of the data stream from the first device; and determining, by the first device, that the first portion of devices is greater than or equal to a pre-determined threshold;

wherein the third device is configured to receive the first portion of the data stream from the first device via a peer-to-peer network that is different from the wireless channel; and based at least in part on the determining whether to distribute the first portion of the data stream, distributing by the first device to the third device, via the peer-to-peer network, the first portion of the data stream;

receiving, by the first device, a second portion of the data stream;

calculating, by the first device, a second proportion of devices communicating with the first device which can receive the second portion of the data stream from the first device;

determining, by the first device, that the second proportion of devices is lower than the pre-determined threshold; and based at least in part on the determining that the second proportion of devices is lower than the pre-determined threshold, determining, by the first device, to not send a packet containing the second portion of the data stream to the third device.

10. The method of claim 9, wherein receiving by the first device via the wireless channel is more expensive than distributing by the first device to the third device over the peer-to-peer network.

11. The method of claim 9, wherein receiving by the first device via the wireless channel comprises receiving by the first device via a cellular network's data service.

12. The method of claim 9, further comprising repeating the receiving, determining, and distributing by the first device for a plurality of randomly distributed portions of the data stream.

13. The method of claim 9, wherein determining whether to distribute the first portion of the data stream to the third device comprises determining, by the first device, whether the first portion of the data stream has made more than a predetermined number of hops through a network.

14. The method of claim 13, wherein:

determining whether the first portion of the data stream has made more than the predetermined number of hops through a network comprises determining, by the first device, that a first time-to-live field associated with the first portion of the data stream is greater than 0; and distributing the first portion of the data stream comprises:
decrementing, by the first device, the first time-to-live field associated with the first portion of the data stream by 1; and
sending, by the first device, a packet containing the first portion of the data stream and the first time-to-live field to the third device.

15. The method of claim 14, further comprising:

determining, by the first device, that a second time-to-live field associated with the second portion of the data stream has reached 0; and based at least in part on the determining that the second time-to-live field associated with the second portion of the data stream has reached 0, determining, by the first device, to not distribute the second portion of the data stream to the third device.

\* \* \* \* \*

UNITED STATES PATENT AND TRADEMARK OFFICE
CERTIFICATE OF CORRECTION

| | |
|---|---|
| PATENT NO. | : 7,961,694 B1 |
| APPLICATION NO. | : 11/754985 |
| DATED | : June 14, 2011 |
| INVENTOR(S) | : Chan et al. |

It is certified that error appears in the above-identified patent and that said Letters Patent is hereby corrected as shown below:

Title page, item (74), under "Attorney, Agent, or Firm", in Column 2, Line 1, delete "Wllliamson" and insert -- Williamson --.

Page 2, item (56), under "Other Publications", in Column 1, Line 3, delete "pp. 2105-21152000." and insert -- 2001, pp. 2105-2115. --.

Page 2, item (56), under "Other Publications", in Column 1, Line 10, delete "ofthe" and insert -- of the --.

Page 2, item (56), under "Other Publications", in Column 1, Line 18, delete "Communicationsand" and insert -- Communications and --.

Page 2, item (56), under "Other Publications", in Column 1, Line 23, delete "•A mobile" and insert -- A mobile --.

Page 2, item (56), under "Other Publications", in Column 1, Line 24, delete "channels,•" and insert -- channels, --.

Page 2, item (56), under "Other Publications", in Column 1, Line 25, delete "Communicationsand" and insert -- Communications and --.

Page 2, item (56), under "Other Publications", in Column 1, Line 25, delete "633•645," and insert -- 633-645, --.

Page 2, item (56), under "Other Publications", in Column 1, Line 27, delete "•WIANI:" and insert -- WIANI: --.

Page 2, item (56), under "Other Publications", in Column 1, Line 28, delete "integration,•" and insert -- integration, --.

Signed and Sealed this
Eleventh Day of October, 2011

David J. Kappos
*Director of the United States Patent and Trademark Office*

Page 2, item (56), under "Other Publications", in Column 1, Line 30, delete "3623•3627." and insert -- 3623-3627. --.

Page 2, item (56), under "Other Publications", in Column 1, Line 31, delete "•MACA:" and insert -- MACA: --.

Page 2, item (56), under "Other Publications", in Column 1, Line 31, delete "ef cient" and insert -- efficient --.

Page 2, item (56), under "Other Publications", in Column 1, Line 32, delete "networks,•" and insert -- networks, --.

Page 2, item (56), under "Other Publications", in Column 1, Line 34, delete "1385•1389." and insert -- 1385-1389. --.

Page 2, item (56), under "Other Publications", in Column 1, Line 35, delete "•MADF:" and insert -- MADF: --.

Page 2, item (56), under "Other Publications", in Column 1, Line 36, delete "A xed" and insert -- a fixed --.

Page 2, item (56), under "Other Publications", in Column 1, Line 36, delete "infrastructure,•" and insert -- infrastructure, --.

Page 2, item (56), under "Other Publications", in Column 1, Line 38, delete "549•554." and insert -- 549-554. --.

Page 2, item (56), under "Other Publications", in Column 1, Line 39, delete "•Resilient" and insert -- Resilient --.

Page 2, item (56), under "Other Publications", in Column 1, Line 40, delete "streaming,•" and insert -- streaming, --.

Page 2, item (56), under "Other Publications", in Column 1, Line 41, delete "16•27." and insert -- 16-27. --.

Page 2, item (56), under "Other Publications", in Column 2, Line 1, delete "•On" and insert -- On --.

Page 2, item (56), under "Other Publications", in Column 2, Line 2, delete "networks,•" and insert -- networks, --.

Page 2, item (56), under "Other Publications", in Column 2, Line 3, delete "1736•1745." and insert -- 1736-1745. --.

Page 2, item (56), under "Other Publications", in Column 2, Line 4, delete "•Research" and insert -- Research --.

Page 2, item (56), under "Other Publications", in Column 2, Line 5, delete "network,•" and insert -- network, --.

Page 2, item (56), under "Other Publications", in Column 2, Line 7, delete "5•8." and insert -- 5-8. --.

Page 2, item (56), under "Other Publications", in Column 2, Line 8, delete "•Multicast" and insert -- Multicast --.

Page 2, item (56), under "Other Publications", in Column 2, Line 8, delete "ooding" and insert -- flooding --.

Page 2, item (56), under "Other Publications", in Column 2, Line 9, delete "networks,•" and insert -- networks, --.

Page 2, item (56), under "Other Publications", in Column 2, Line 11, delete "61•68." and insert -- 61-68. --.

Page 2, item (56), under "Other Publications", in Column 2, Lines 12-13, delete "•Selecting" and insert -- Selecting --.

Page 2, item (56), under "Other Publications", in Column 2, Line 13, delete "networks,•" and insert -- networks, --.

Page 2, item (56), under "Other Publications", in Column 2, Line 14, delete "101•111," and insert -- 101-111, --.

Page 2, item (56), under "Other Publications", in Column 2, Line 15, delete "•Multipoint" and insert -- Multipoint --.

Page 2, item (56), under "Other Publications", in Column 2, Line 16, delete "ooding" and insert -- flooding --.

Page 2, item (56), under "Other Publications", in Column 2, Line 16, delete "networks,•" and insert -- networks, --.

Page 2, item (56), under "Other Publications", in Column 2, Line 18, delete "3866•3875." and insert -- 3866-3875. --.

Page 2, item (56), under "Other Publications", in Column 2, Line 19, delete "•On" and insert -- On --.

Page 2, item (56), under "Other Publications", in Column 2, Line 20, delete "networks,•" and insert -- networks, --.

Page 2, item (56), under "Other Publications", in Column 2, Line 21, delete "129•130." and insert -- 129-130. --.

Page 2, item (56), under "Other Publications", in Column 2, Line 22, delete "•AHBP: An ef cient" and insert -- AHBP: An efficient --.

Page 2, item (56), under "Other Publications", in Column 2, Line 23, delete "networks,•" and insert -- networks, --.

Page 2, item (56), under "Other Publications", in Column 2, Line 24, delete "114•125," and insert-- 114-125, --.

Page 2, item (56), under "Other Publications", in Column 2, Line 25, delete "•WCA:" and insert -- WCA: --.

Page 2, item (56), under "Other Publications", in Column 2, Line 26, delete "networks,•" and insert -- networks, --.

Page 2, item (56), under "Other Publications", in Column 2, Line 27, delete "193•204," and insert -- 193-204, --.

Page 2, item (56), under "Other Publications", in Column 2, Line 28, delete "•Constant-time" and insert -- Constant-time --.

Page 2, item (56), under "Other Publications", in Column 2, Line 29, delete "approximation,•" and insert -- approximation, --.

Page 2, item (56), under "Other Publications", in Column 2, Line 30, delete "Computting" and insert -- Computing --.

Page 2, item (56), under "Other Publications", in Column 2, Line 30, delete "25•32." and insert -- 25-32. --.

Page 2, item (56), under "Other Publications", in Column 2, Line 31, delete "•COSMOS:" and insert-- COSMOS: --.

Page 2, item (56), under "Other Publications", in Column 2, Line 32, delete "mobiles,•" and insert -- mobiles, --.

Page 2, item (56), under "Other Publications", in Column 2, Line 34, delete "865•868." and insert -- 865-868. --.

CERTIFICATE OF CORRECTION (continued)
U.S. Pat. No. 7,961,694 B1

Page 2, item (56), under "Other Publications", in Column 2, Line 35, delete "•Broadcast-based" and insert -- Broadcast-based --.

Page 2, item (56), under "Other Publications", in Column 2, Line 36, delete "mobiles,•" and insert -- mobiles, --.

Page 2, item (56), under "Other Publications", in Column 2, Line 39, delete "•Broadcast-based" and insert -- Broadcast-based --.

Page 2, item (56), under "Other Publications", in Column 2, Line 40, delete "mobiles,•" and insert -- mobiles, --.

Column 17, lines 5-6, in Claim 9, delete "first portion of devices" and insert -- first proportion of devices --.